US007336664B2

(12) United States Patent
Maciel

(10) Patent No.: US 7,336,664 B2
(45) Date of Patent: Feb. 26, 2008

(54) DATA PROCESSING DEVICE AND ITS INPUT/OUTPUT METHOD AND PROGRAM

(75) Inventor: Frederico Buchholz Maciel, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 977 days.

(21) Appl. No.: 10/320,607

(22) Filed: Dec. 17, 2002

(65) Prior Publication Data

US 2003/0214909 A1    Nov. 20, 2003

(30) Foreign Application Priority Data

May 15, 2002    (JP)    ............................. 2002-139572

(51) Int. Cl.
*H04L 12/28*    (2006.01)
(52) U.S. Cl. .................... 370/395.4; 709/328
(58) Field of Classification Search ............... None
See application file for complete search history.

(56) References Cited

U.S. PATENT DOCUMENTS

| 6,370,592 B1 * | 4/2002 | Kumpf ........................ 719/328 |
| 6,687,905 B1 * | 2/2004 | Day et al. ................... 718/102 |
| 6,938,111 B2 * | 8/2005 | Herberth ..................... 710/104 |

OTHER PUBLICATIONS

"InfiniBand™ Architecture Specification vol. 1", (Release 1.0.a), Jun. 19, 2001, pp. 1-114.
John Hufferd, IBM Sr. Technical Staff Member, "The Outboarding of TCP/IP", e-business, Feb. 7, 2001, 11 slides.
W. Richard Stevens, "UNIX Network Programming", Communication Protocols, (A Network Primer) pp. 197-273.
Alessandro Rubini, "LINUX Device Drivers", O"Reilly, pp. 136-145.
Daniel P. Bovet and Marco Cesati, "Understanding the LINUX Kernel", O'Reilly, pp. 1-11, 64-67, 118-149, 310-327.

* cited by examiner

*Primary Examiner*—Robert W. Wilson
(74) *Attorney, Agent, or Firm*—Reed Smith LLP; Stanley P. Fisher, Esq.; Juan Carlos A. Marquez, Esq.

(57) ABSTRACT

The present invention improves input/output speed by multiplexing/demultiplexing data and also reducing the processing time required for interrupt handling. The present invention involves a process which requests input/output operation; an adapter which performs input/output operation based on the request from the process; and a scheduler which keeps the process in wait state while the adapter is performing input/output operation. When the input/output operation of the adapter is completed, the state of the process waiting for the completion of the operation is changed into "runnable" by the adapter, and the execution of the process which requested input/output operation is thereby restarted.

4 Claims, 7 Drawing Sheets

DATA PROCESSING DEVICE AND ITS INPUT/OUTPUT METHOD AND PROGRAM

BACKGROUND OF THE INVENTION

1. Field of the Invention

The present invention in general relates to an input/output adapter and more particularly to an adapter which connects a disk unit, a network, and the like to a computer or the like and processes protocols used for the disk unit and the network.

2. Description of Related Art

There are a plurality of different types of disk connecting system and networks, and their examples include Ethernet (registered trade name), Fibre Channel, ATM, and parallel SCSI.

When these disk connecting systems or networks are connected to a data processing device such as host (computer), an adapter is used for linking the internal I/O bus of the host with the disk connecting systems or networks.

With respect to personal computers, a network adapter for connecting the PCI bus with Ethernet is an example of such adapters. (These adapters are usually in the form of card to be inserted into a PCI bus connector, however there are cases where its components are directly built in the motherboard. The latter case is also referred to as "adapter" in the present invention.)

Referring to FIG. 6, an explanation will be given to the operation of an adapter for a computer system, and the kernel and processes of an operating system (hereafter, referred to as "OS").

In this specification, an explanation will be given mainly based on the case of a network adapter and the TCP/IP protocol (Refer to "UNIX Network Programming," W. Richard Stevens, Prentice Hall, U.S.A., 1990, ISBN 0-13-949876-1, hereafter, referred to as "Reference 1."), which is widely used in network communication. Also, the Sockets API (Application Programming Interface: aggregate of functions which processes calls to use some function of a computer or an operating system) for communication using TCP/IP will be used in the examples (Refer to Reference 1.) Furthermore, the Linux kernel (Refer to "Understanding the Linux Kernel," D. P. Bovet, M. Cesati, O'Reilly & Associates, 2001, ISBN 0-596-00002-2, hereafter, referred to as "Reference 2") may be taken as an example of OS. However, the present invention is not limited to network adapters, the TCP/IP protocol, the Sockets API, or the Linux kernel.

First, in case of FIG. 6, a plurality of processes (programs) 31 and 32 of the host 1 carry out communication using the adapter 2. (The party on the other end on the network is not shown in FIG. 6 or in the following drawings.) The kernel 4 controls the adapter 2 and multiplexes/demultiplexes the data and control of the processes 31 and 32. Next, an explanation will be given to multiplexing/demultiplexing.

First, an explanation will be given to multiplexing/demultiplexing of data. The adapter 2 transmits and receives the data of a plurality of the processes 31 and 32 in a lump (i.e., the data is not received and transmitted separately for each process 31 and 32); therefore, the kernel 4 multiplexes/demultiplexes data between the plurality of the processes 31 and 32 and the adapter 2 through the buffer 45. First, an explanation will be given to receiving processing. When the adapter 2 receives packets through the network, the adapter writes the packets to the buffer 45 of the kernel 4. (The adapter is capable of writing and reading data to and from the main memory by DMA.)

At the completion of reception, the adapter 2 generates an interrupt, and this interrupt is handled by the code of the interrupt handler 47 for the adapter 2, which in turn calls the device driver 46. The device driver 46 reads the packets from the buffer 45, checks the communication protocol of the packets, and calls the protocol processing 43 for the corresponding protocol (TCP/IP in this example).

Under TCP/IP, data is communicated on logical connections established in advance of data transmission. To perform TCP/IP processing, the protocol processing 43 has a protocol processing table 44 for managing the state of communication and recording the correspondences between logical connections and processes and the like. The protocol processing 43 checks the processes 31 and 32 which are the destinations of the received data, copies the data to the respective buffers 33 and 34 of the processes 31 and 32, releases the area in the buffer 45 for the received data, and completes the receiving processing.

Transmitting processing is mostly done in the reverse order of receiving processing. First, a process 31 and 32 specifies transmission data 33 and 34 and calls the protocol processing 43. The protocol processing 43 copies the data 33 and 34 to the buffer 45, assembles packets on the buffer 45, and calls the device driver 46. The device driver 46 controls and causes the adapter 2 to transmit the packets. When the transmission is completed, the adapter 2 generates an interrupt. This interrupt is handled by the interrupt handler 47 and the device driver 46, and the device driver 46 releases the area in the buffer 45 where the transmitted packets were stored.

Next, an explanation will be given to multiplexing/demultiplexing of process control. In FIG. 6, the adapter 2 generates interrupts related to a plurality of the processes 31 and 32 in a lump (i.e., the interrupts are not generated separately for each process 31 and 32); therefore, the kernel 4 also multiplexes/demultiplexes the interrupts to perform process control of the processes 31 and 32. (Usually, this processing is not called "multiplexing/demultiplexing"; however, this term is used in the present invention to highlight its analogy to multiplexing/demultiplexing of data.)

The process control mainly changes the state of processes, as described next. Each process has a plurality of states: for example, "running" (the state in which any of CPUs is executing this process), "runnable" (the state in which this process can be executed but no CPUs are currently executing it), and "I/O wait" (the state in which this process is waiting for transmission, reception, or the like to be completed). (Refer to Reference 2. The processes in Linux have these states but the states of task_struct in Linux do not have a one-to-one correspondence to the three states mentioned above.)

At the time of transmission/reception, the kernel 4 manages the state of each of the processes 31 and 32 and records the states in the process table 42.

The time chart of receiving processing in FIG. 8 is taken as an example. When a process 31 and 32 uses a blocking call (which waits until data reception is completed) of the Sockets API, the protocol processing 43 of the kernel 4 is called (800). If data has not been received, the protocol processing 43 calls the scheduler 41 of the kernel 4 (801), and changes the state of the process 31 and 32 from "running" to "I/O wait."

When data reception is completed, the adapter 2 generates an interrupt (802). The interrupt handler 47, the device driver 46, and the protocol processing 43 are called (803, 804). The protocol processing 43 checks to see which process 31 and 32 corresponds to the reception during the receiving processing, and calls the scheduler 41 if the state thereof needs be changed (805). The scheduler 41 changes the process 31 and 32 which transmitted or received data to the runnable state.

Thereafter (immediately after the process is brought into runnable state or after one or more timer 5 interrupts (described later)), the process 31 and 32 is brought into running state (806), and the receiving processing is completed (807).

Independently of any data transmission or reception, the timer 5 periodically generates an interrupt (100 Hz for Linux. Refer to page 140 in Reference 1.), and, subsequently to the timer (interrupt) handler 48, the scheduler is called. (Refer to pages 133 and 142 in Reference 1.) If necessary, the scheduler 41 selects which of processes 31 and 32 in runnable or running state should be brought into running or runnable state. The kernel implements timesharing by this processing.

Recently, the performance of networks has been increasing more rapidly than the performance of servers. As a result, the processing of the TCP/IP protocol is increasingly becoming a bottleneck.

To cope with this, two methods for protocol processing in an adapter were developed: TCP/IP implemented in hardware (Refer to "The Outboarding of TCP/IP," J Hufferd, e-Commerce Infrastructure Technology Conference and Tradeshow, February 2001, Monterey, U.S.A.) and the InfiniBand network which implements functions, such as logical connection, equivalent to the TCP/IP by its own protocol (Refer to "InfiniBand Architecture Specification Volume 1, Release 1.0.a").

Referring to FIG. 7, an explanation will be given to an adapter 600 which processes a protocol taking an InfiniBand adapter as an example.

The adapter 600 manages the processing and the state of communication of individual logical connections at the communication endpoints 610 to 630 of the logical connections. (These communication endpoints are called Queue Pairs (hereafter, abbreviated to "QP") in InfiniBand.)

A process 31 and 32 establishes a logical connection through the protocol processing 49 and the device driver 50. After the establishment, the process directly accesses an endpoint 610 to 630, bypassing the kernel 4. (The protocol processing 49, the protocol processing table 40, and the device driver 50 are equivalent to the protocol processing 43, the protocol processing table 44, and the device deriver 46, respectively. However, the protocol processing of the latter is not included in the former, only the function of connection management is included.)

To directly transmit and receive the data 33 and 34 of the processes 31 and 32, the adapter 600 performs multiplexing/demultiplexing 64 of the data of a plurality of communication endpoints 610 to 630. Therefore, in the case of the adapter 600, multiplexing/demultiplexing of data is performed by the adapter 600, not by the kernel 4.

To directly drive the InfiniBand adapter 600, APIs different from the Sockets API are used. It is expected that APIs for InfiniBand will also have blocking calls (these APIs are currently under standardization.)

The processing related to the InfiniBand adapter 600 in FIG. 7 also follows the time chart in FIG. 8. In order that the adapter 600 may perform protocol processing for data transmission/reception, the protocol processing 49 calls the scheduler 41 when a blocking call is made (800) (As a modification, the processes 31 and 32 can directly call the scheduler by providing special system calls.) At the completion of transmission/reception, the adapter 600 generates an interrupt (802).

In the example of prior art in FIG. 7, the adapter 600 which processes protocols bypasses the kernel 4 at the time of data transmission/reception, bypasses the protocol processing 43, and eliminates the copying of data between the buffers 33 and 34 of the processes 31 and 32 and the buffer 45. Consequently, the use of the adapter 600 reduces the processing burden on the server CPUs and eliminates part of the bottleneck which is created in ordinary adapters 2 (FIG. 6).

However, the adapter 600 which processes protocols performs multiplexing/demultiplexing of data but does not perform multiplexing/demultiplexing of control. When the processes 31 and 32 use a blocking reception call of the Sockets API, processing associated with interrupt, that is, execution of the interrupt handler 47, the device driver 50, the protocol processing 49, and the scheduler 41 (802 to 805) is required. As a result, while data communication bypasses the kernel 4, control does not bypass the kernel 4; therefore, part of the bottleneck remains.

When the adapter 600 completes the transmission/reception of data, the kernel executes the interrupt handler 47, calls the protocol processing 49 and the scheduler 41, and brings the process 31 and 32 waiting for data transmission/reception (I/O wait) into runnable state. As illustrated in FIG. 7, interrupt processing must be performed each time transmission/reception is completed on the plurality of the endpoints 610 to 630. Consequently, processing is required to change the state of the processes from "I/O wait" to "runnable", and thus the overhead in communication processing when using the adapter 600 cannot be eliminated only by the multiplexing/demultiplexing of data.

SUMMARY OF THE INVENTION

The present invention is made to solve the above problem and is intended to perform multiplexing/demultiplexing of data and further reduce the time required for interrupt handling for the improvement of input/output speed.

The input/output method of the present invention involves processing which requests input/output operations, an adapter which performs input/output operations based on the requests from the processing, and a scheduling means which keeps the above processing in I/O wait state while the adapter is performing input/output operations. In this input/output method, when the input/output operation on the adapter is completed, the state of processing which has been waiting for the completion of this input/output operation is changed into "runnable" by the adapter, and the processing which requested the input/output operation is thereby restarted.

More specifically, a process 31, 32 makes a blocking call, and, when transmission/reception associated with this call is completed, the adapter 6 changes the state of the process 31, 32 stored in the process table 42 into "runnable." On this account, the state of the process 31, 32 can be changed without an interrupt or processing by the kernel 4. When the scheduler 41 is thereafter executed by the timer handler 48, the process 31, 32 is changed to "running" state.

If there is any idle CPU in the host 1, the process 31, 32 brought into "runnable" at the completion of transmission/reception must be immediately brought into "running" to improve the performance. For this reason, an interrupt is generated if there is an idle CPU. Subsequently to the interrupt handling, the scheduler 41 is called, and the process 31 and 32 is changed to "running" state.

In the present invention, therefore, when an input/output operation is requested, the input/output operation is performed by the adapter, and the processing which requested the operation is brought into I/O wait state. When the input/output operation is completed, the adapter directly changes the state of the processing from wait state to runnable state. Thus, the processing time from the completion of input/output operation to restarting of the processing is shortened, and this enhances the efficiency in input/output processing and thus the speed thereof.

DETAILED DESCRIPTION OF THE PREFERRED EMBODIMENTS

Referring to the accompanying drawings, an embodiment of the present invention will be described below.

Figure 1:
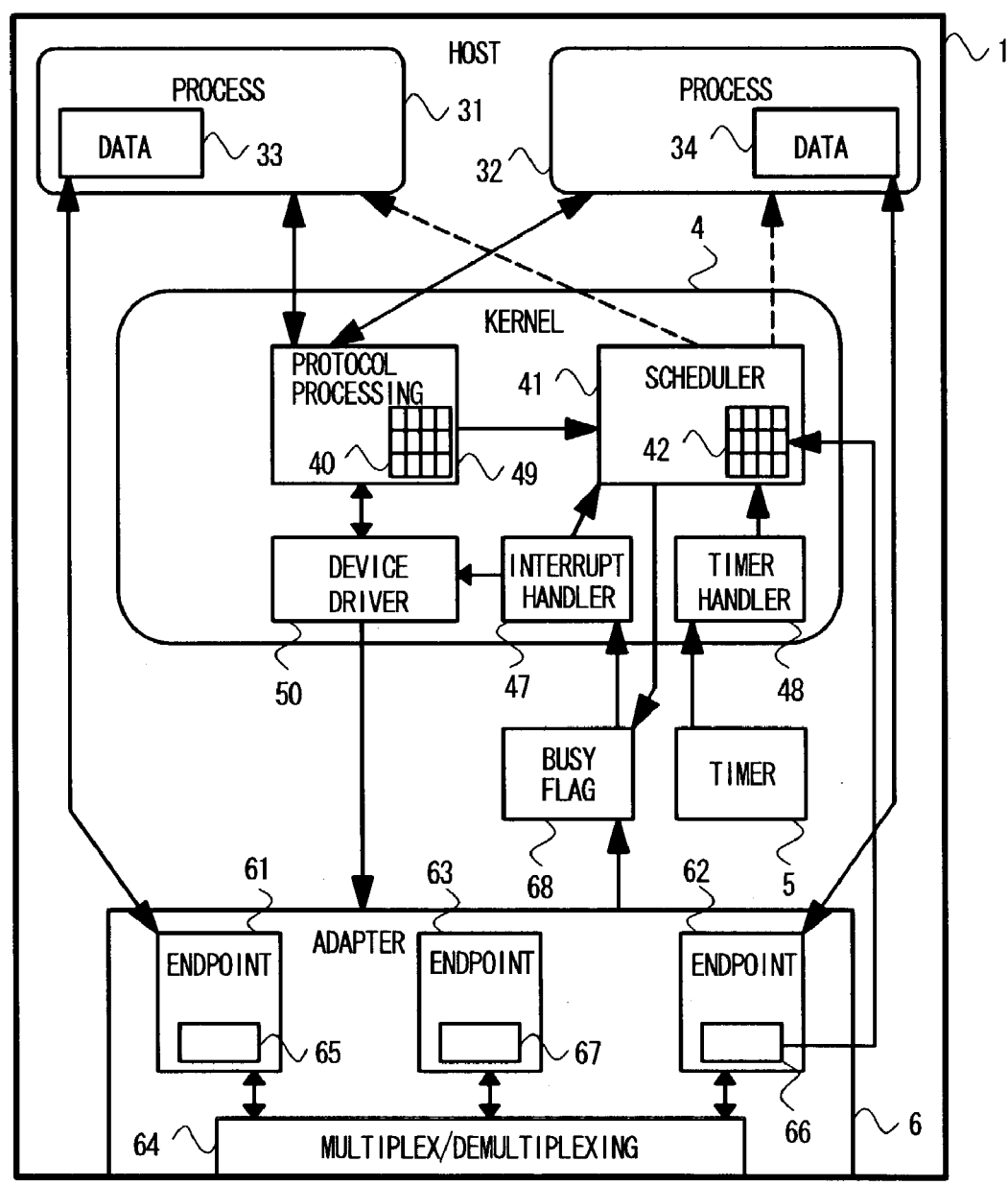
FIG. 1 is a block diagram illustrating one embodiment of the present invention and outlining the functions of the host.
Figure 7:
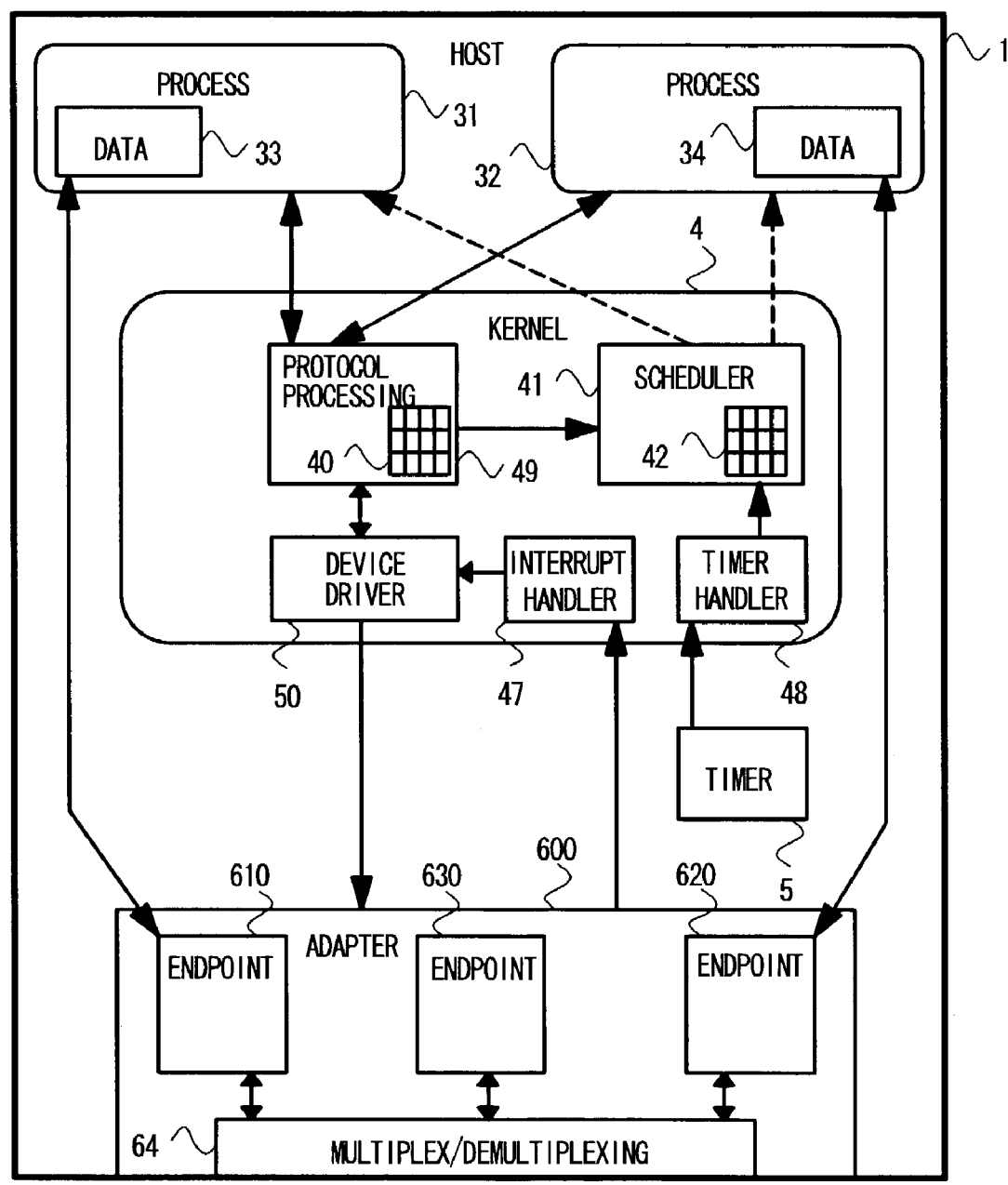
FIG. 7 is a block diagram illustrating another example of related art and outlining the functions of the host using an InfiniBand adapter.

FIG. 1 illustrates an example wherein the present invention is applied to the InfiniBand adapter illustrated as related art in FIG. 7.

A plurality of the processes 31 and 32 (applications) running under the operating system on the host (computer) 1 communicate with the outside of the host 1 through the network 7 using the InfiniBand adapter 6. The kernel 4 of the operating system (hereafter, referred to as "OS") controls the InfiniBand adapter 6 and performs multiplexing/demultiplexing of the data 33 and 34 and of the control of the processes 31 and 32.

Figure 2:
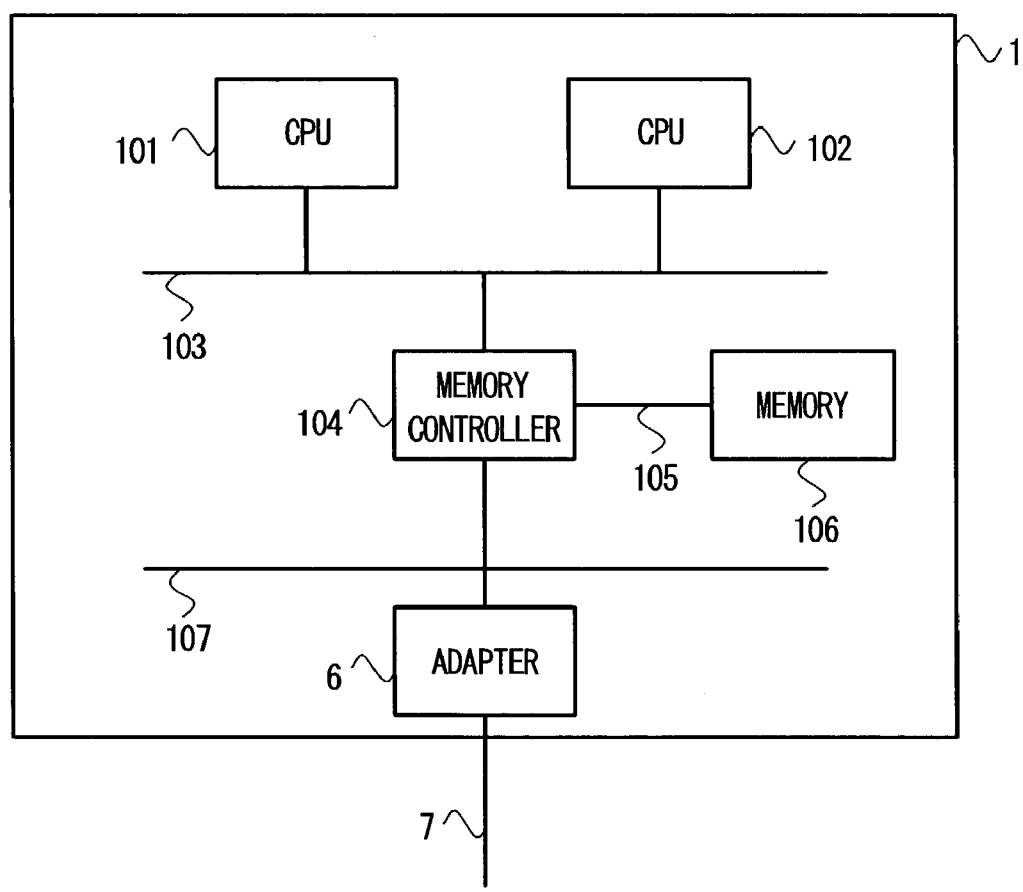
FIG. 2 is a schematic diagram illustrating the hardware of the host.

FIG. 2 schematically illustrates the hardware configuration of the host 1.

In the host 1, a plurality of the CPUs (processors) 101 and 102 are connected with the memory controller 104 through the CPU bus 103, and the memory controller 104 is connected with the memory 106 through the memory bus 105. The memory 106 is accessed by the CPUs 101 and 102 or other devices.

Further, the memory controller 104 is connected with the InfiniBand adapter 6 through the internal I/O bus 107, and thus the CPUs 101 and 102 can communicate with the external network 7.

The memory controller 104 includes an interrupt controller and the like, and the memory 106 is used as main memory. The CPUs 101 and 102 may be constituted of logically independent virtual processors.

In FIG. 1, the adapter 6 manages processing of logical connections and the state of communication at the communication endpoints 61 to 63 (Queue Pairs, hereafter, referred to as "QP") of the logical connections.

The processes 31 and 32 establish logical connections through the protocol processing 49 and the device driver 50. After the logical connections are established, the processes directly access the endpoints 61 to 63 by bypassing the kernel 4.

To directly transmit and receive the data 33 and 34 of the processes 31 and 32, the adapter 6 performs multiplexing/demultiplexing 64 of a plurality of the communication endpoints 61 to 63. Therefore, in the case of the InfiniBand adapter 6, multiplexing/demultiplexing of data is performed by the InfiniBand adapter 6, not by the kernel 4.

The process control of the operating system changes the state of processes, as described next. Each process has a plurality of states: for example, "running" (the state in which any of CPUs is executing this process), "runnable" (the state in which this process can be executed but no CPUs are currently executing it), and "I/O wait" (the state in which this process is waiting for transmission, reception, or the like to be completed. (Refer to Reference 2. The processes in Linux have these states but the states of task_struct in Linux do not have a one-to-one correspondence to the three states mentioned above.)

The kernel 4 of the OS (Linux in this case) includes the protocol processing 49 and the device driver 50 which establish logical connections between the processes 31 and 32 and the adapter 6. The kernel 4 also includes the scheduler 41 which controls the state of the processes 31 and 32, being called by the timer handler 48 according to the timer 5 or by the interrupt handler 47.

Further, the table 42 of the scheduler 41 is constituted in a way that the state-changing facilities 65 to 67 respectively provided in the endpoints 61 to 63 of the adapter 6 can directly write to this table.

The busy flag 68 indicating whether there is an idle CPU is provided, and the busy flag 68 is set by the scheduler 41 and makes it possible to control interrupt requests from the adapter 6 according to whether any CPUs are idle.

Next, an explanation will be given to the state-changing facilities 65 to 67 respectively provided in the endpoints 61 to 63.

When the protocol processing 49 allocates an endpoint 61 to 63 to a process 31 and 32 and establishes the logical connection to this endpoint 61 to 63, the protocol processing stores the address of the entry in the process table 42 indicating the state of this process 31 and 32 in the state-changing facility 65 to 67 of the endpoint 61 to 63. Thus, the state-changing facility 65 to 67 of each endpoint can write to the entry in the process table 42 corresponding to the logical connection to the endpoint.

When the address is stored in the state-changing facilities 65 to 67, a value indicating "runnable" in the field in the entries in the process table 42 and the byte width thereof are also stored in the state-changing facilities 65 to 67. The process table 42 of the scheduler 41 is a storage area preset in a specified area in the main memory.

In case the process 31 and 32 uses a blocking call during data transmission/reception on a logical connection, when the process accesses the endpoint 61 to 63 to start the transmission/reception, the process makes a request to change the state thereof at the completion of this transmission/reception. (Like the above-mentioned example of related art, the processing of accessing of the endpoint is performed by a communication library related to the adapter 6, under the level of the standard API.)

Figure 3:
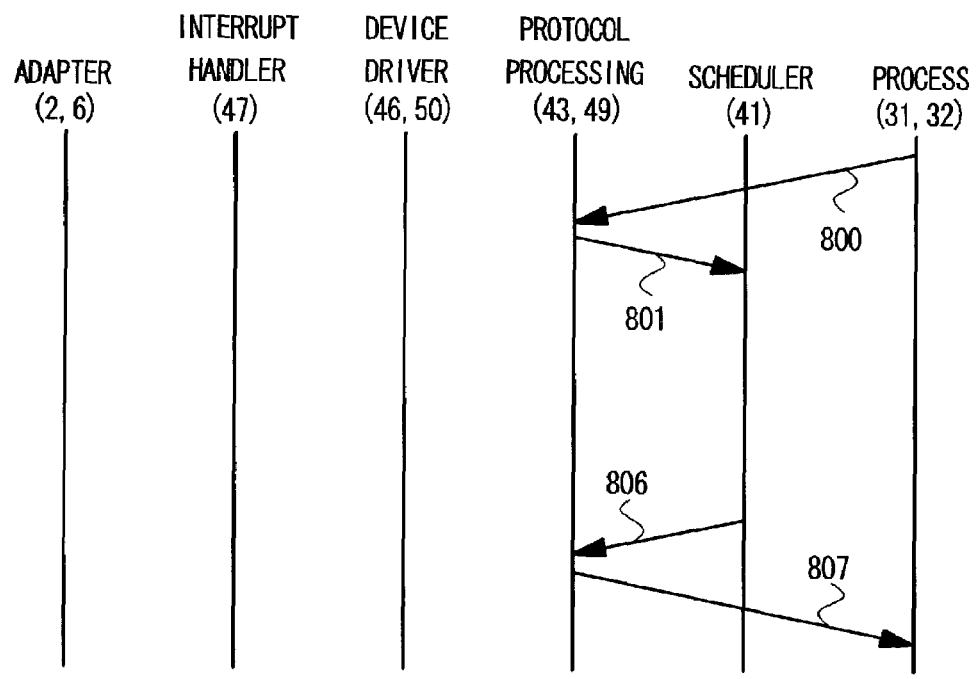
FIG. 3 is a time chart illustrating the operation of the state-changing facility of the adapter.

The operation of the state-changing facilities 65 to 67 will be described referring to the time chart in FIG. 3.

The process 31 and 32 calls the protocol processing 49 (800 in FIG. 3), and the protocol processing 49 brings the process into I/O wait state and calls the scheduler 41 (801). (At this time, if there are "runnable" processes 31 and 32, one of them is brought into "running" state.)

When the transmission/reception is completed, the endpoint 61 to 63 writes the value indicating "runnable" to the process table 42 in the main memory by DMA, based on the values stored in the state-changing facility 65 to 67, thus changing the state of the process 31 and 32 from "I/O wait" to "runnable." (In FIG. 1, writing from the state-changing facility 66 of the endpoint 62 to the process table 42 is indicated by an arrow.) After one or more timer 5 interrupts, the process 31 and 32 is brought into "running" state (806), and the processing of the blocking call is completed (807).

If all the CPUs are busy when the transmission/reception at the endpoint is completed, the performance of the host 1 is not improved even by calling the scheduler. (This is because the time quantum of the running process has not ended and the state of the process 31 and 32 is not changed.) For this reason, the process brought into "runnable" state by writing from the state-changing facility 65 to 67 to the process table 42 is brought into "running" state when the timer handler 48 is thereafter executed.

If there is any idle CPU, for the improvement of the performance of the host 1, it is necessary to immediately call the scheduler and bring the process which has been brought into "runnable" state into "running" state.

As a result, it is required to determine whether an interrupt should be generated or not according to whether the CPUs are busy. To exercise this interrupt control, the above-mentioned busy flag 68 as a flag indicating whether there is any idle CPU is provided, and the scheduler 41 sets the busy flag 68.

If there is any idle CPU, the busy flag 68 enables an interrupt generated by the adapter 6; and if not, the busy flag 68 disables the interrupts. (However, interrupts related to exception handling, such as error, are not inhibited. The busy flag 68 should not be used to monitor exception handling, and instead the use of another interrupt line (not shown) is preferable.)

Figure 4:
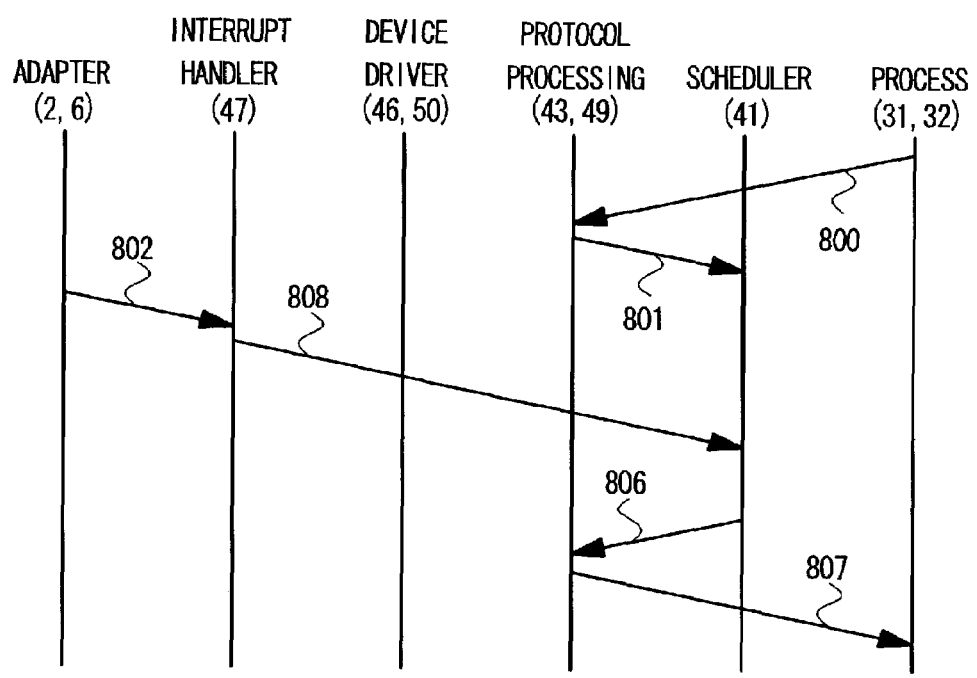
FIG. 4 is a time chart illustrating interrupt handling from the adapter.

FIG. 4 illustrates the flow of handling of the above-mentioned interrupt.

After modifying the process table 42 by using the state-changing facility 65 to 67, the adapter 6 generates an interrupt which starts the interrupt handler 47 (802).

When the interrupt handler 47 checks the state of the adapter 6 and acquires the information that this interrupt was generated for changing the state of the process 31 and 32, it turns out that the device driver 50 need not be called. Thus, the scheduler 41 is called (808), the target process 31 and 32 is brought into "running" state (806), and the processing of the blocking call is completed (807).

In FIG. 4, the scheduler 41 is called directly from the interrupt handler 47, which is depicted as the normal flow of processing. However, since in Linux the scheduler 41 cannot be called directly from the interrupt handler 47, the scheduler 41 should be indirectly called by using delayed processing, such as a in a bottom half routine.

Summarizing, when the adapter 6 establishes a logical connection to the endpoint 61 to 63, the address of an entry in the process table 42 corresponding to the process whose logical connection has been established is stored in the state-changing facility 65 to 67, and thereafter transmission/reception is performed. At the completion of the transmission/reception, the state-changing facility 65 to 67 of the adapter 6 updates the entry in the process table 42 corresponding to the transmission/reception from "I/O wait" to "runnable," and thereafter, the adapter 6 generates an interrupt. As a result, the scheduler 41 can be directly called.

Figure 8:
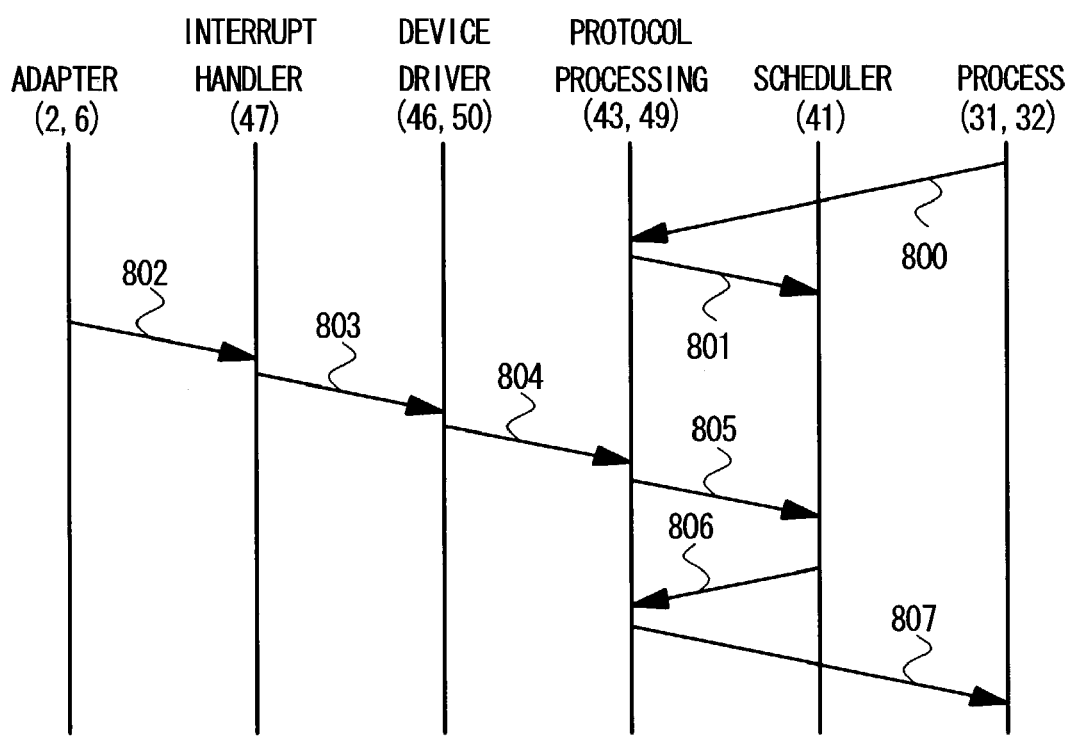
FIG. 8 is a time chart illustrating an example of related art and depicting interrupt handling from the adapter.

In the above-mentioned examples of prior art, the kernel 4 executes the interrupt handler 47, the device driver 50, the protocol processing 49, and the scheduler in this order, as illustrated in FIG. 8. Meanwhile, in the present invention, the scheduler 41 is called directly from the interrupt handler 47, and thus the Steps 803, 804, and 805 in FIG. 8 illustrating the above-mentioned example of prior art are obviated. Thus, the overhead caused by their execution can be reduced, and the time from the completion of transmission/reception to the execution of process can be shortened. As a result, the processing of communication (or input/output) between the processes 31 and 32 and the adapter 6 can be accelerated.

Needless to say, the present invention is not limited to the above-mentioned embodiments or modifications thereof, and may be embodied by the modifications described below or other modifications. Further, the present invention may be embodied by a plurality of the above-mentioned embodiments, arts described as modifications thereof, or a combination of the following modifications.

(Modification 1)

In FIG. 1 above, the protocol processing table 40 has the information of the protocol processing. However, this information may be provided in a plurality of tables in actual kernels 4. The present invention can be also implemented in this case.

(Modification 2)

The present invention is not limited to the InfiniBand adapter 6 and is applicable to adapters which process other protocols (e.g. TCP/IP).

In case of an adapter which processes TCP/IP, possibly there are cases where the adapter does not have endpoints 61 to 63 individually implemented. However, since the adapter manages the state of each TCP/IP logical connection, the present invention can be implemented by adding a function equivalent to the state-changing facilities 65 to 67 to this management.

While in the InfiniBand, the completion of each transmission/reception operation is clear, in TCP/IP, which is a streaming protocol, data flows continuously, and the point on this flow which corresponds to the completion of a transmission/reception operation on the processes 31 and 32 is invisible at the protocol level. On this account, the transmission/reception of one packet, the minimum amount of data set by the processes 31 and 32, or the like is taken as the criterion for the completion of transmission/reception.

(Modification 3)

The present invention is applicable not only to network adapters, such as the above-mentioned InfiniBand and TCP/IP adapters, but also to disk adapters and adapters for other kinds of I/O devices. For example, conventionally, when a disk adapter starts data input/output (write/read) operation, the OS specifies a main memory address at which data is to be written/read and a disk block to or from which data is to be written/read, and input/output is done between this main memory address and this disk block.

To apply the present invention to this conventional disk adapter, information (write address, value, and byte width)

equivalent to the state-changing facilities 65 to 67 only has to be added to information for starting the above-mentioned input/output operation, and the adapter only has to be provided with a function of writing the information equivalent to the state-changing facilities 65 to 67 to the process table 42 on the kernel 4 side at the completion of transmission/reception.

(Modification 4)

The above description gives an example in which, when a logical connection is established, a value indicating "runnable" and the byte width thereof are stored in the adapter 6. The timing with which information indicating "runnable" is stored in the adapter 6 is not limited to the foregoing but the information may be stored, for example, when the adapter 6 is initialized. Further, instead of storing the value in the individual state-changing facilities 65 to 67, adding a mechanism to store the value in a single location for the entire adapter may be considered.

(Modification 5)

Figure 5:
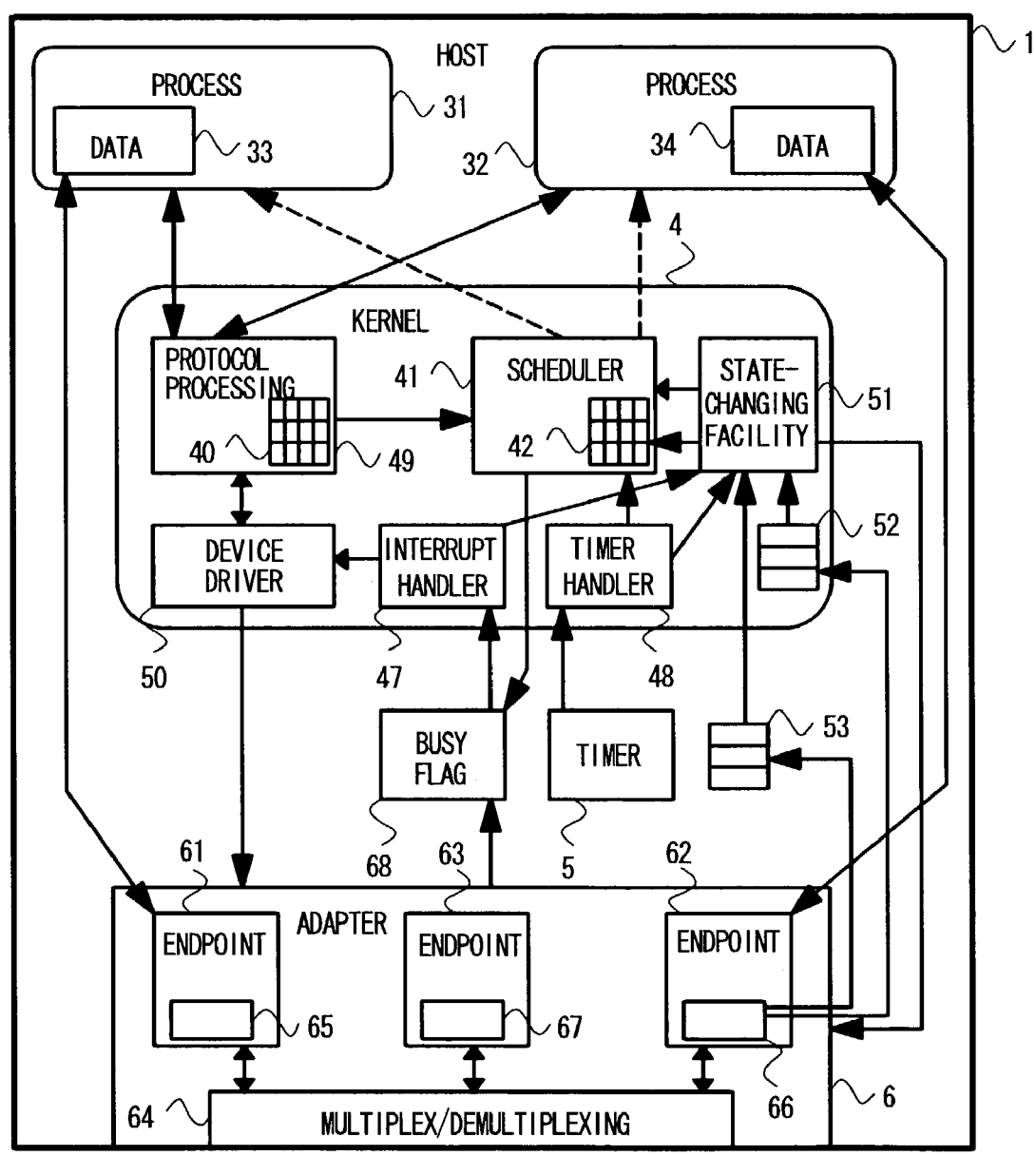
FIG. 5 is a block diagram illustrating another embodiment and outlining the functions of the host.
Figure 6:
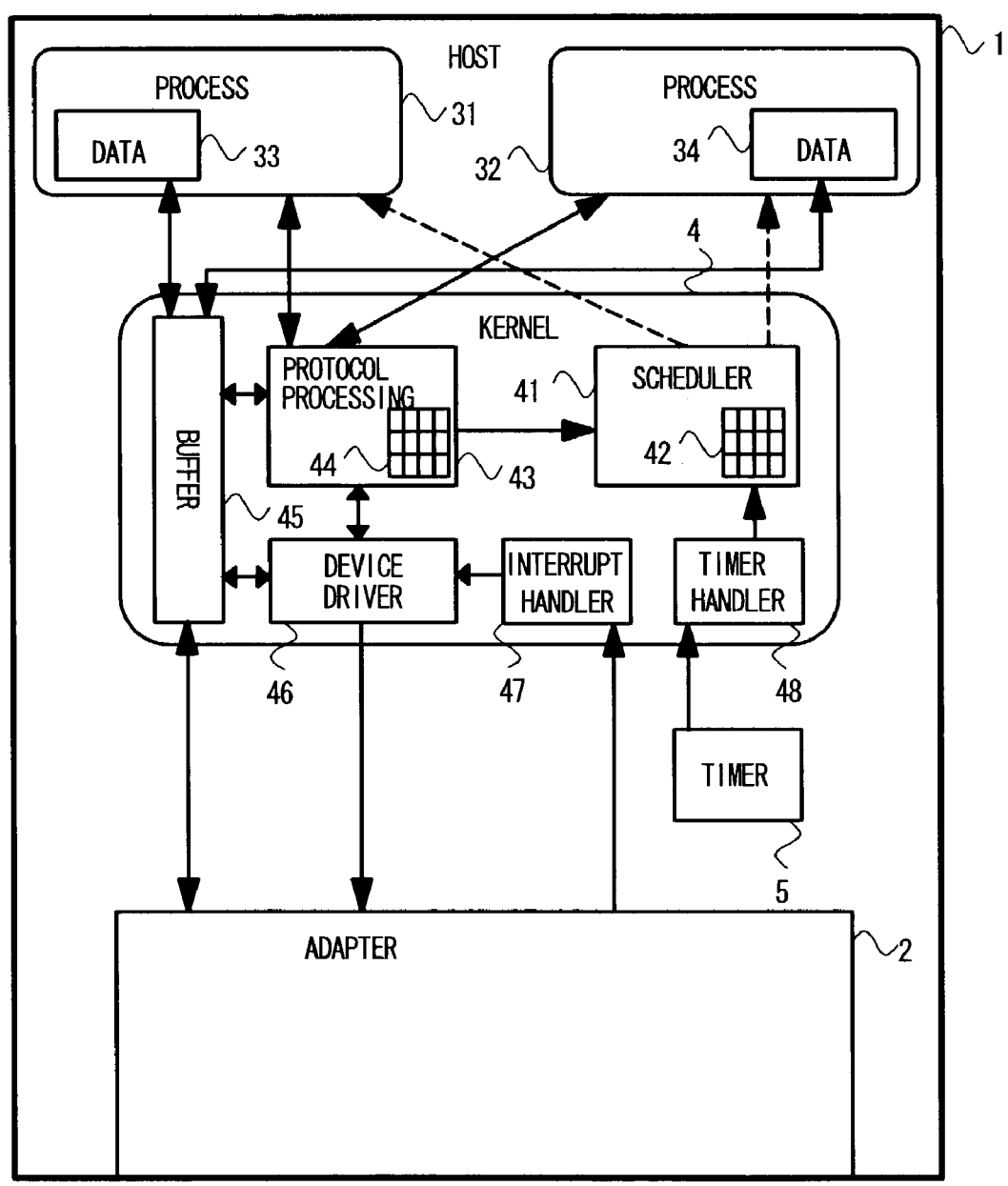
FIG. 6 is a block diagram illustrating an example of related art and outlining the functions of the host using a network adapter.

In FIG. 1, the state-changing facilities 65 to 67 of the adapter 6 may be made to take as the destination of writing another table (52) illustrated in FIG. 5, instead of the process table 42.

Since this mode of operation of the invention reduces modification to the kernel 4 and prevents hardware from directly accessing the process table 42, the mode of operation is preferable in terms of man-hours in the development of the kernel 4 and the reliability thereof. In this case, the state-changing facility 51 of the kernel 4 periodically checks the values in the table, and, if input from the adapter 6 takes place, changes the state of the target process in the process table 42.

Further, when there is an idle CPU and an interrupt is generated, the scheduler 41 is not called directly from the interrupt handler 47. Instead, the following steps are taken: the state-changing facility 51 is called, and the state-changing facility 51 updates the process table 42 and calls the scheduler 41.

Possible methods for the state-changing facility 51 to periodically check the table 52 include use of Task Queues in Linux. (Refer to "Linux Device Drivers," A. Rubini, O'Reilly & Associates, ISBN 1-56592-292-1.) When the adapter 6 is initialized, a task for checking the entries (the state-changing facility 51) is put in the tq_timer task queue. When executed, the state-changing facility 51 adds itself again to this task queue, and thus the task of checking the entries is executed at each timer 5 interrupt.

In case of this modification, process identifiers (e.g. process numbers) may be used as the entries to the process table 42, instead of addresses at which data is written, values, and byte widths. One of possible data structures of the table 52 is a circular queue. In case of circular queue, the adapter 6 writes information (e.g. identifier) of the process 31 and 32 whose state is to be changed to this circular queue, and the state-changing facility 51 which periodically checks the information consumes this information. The adapter 6 or the state-changing facility 66 is notified of the information consumed by the state-changing facility 51. (In case the entire adapter 6 is only provided with a table 52, the adapter 6 is notified. In case each state-changing facility 66 is provided with a table 52, the state-changing facility 66 is notified.)

(Modification 6)

In the above-mentioned embodiments and modifications, the adapter 6 writes information related to a process 31 and 32 to the main storage, and the state of the target process is thereby changed directly or indirectly. There is an alternative method wherein, as illustrated in FIG. 5, a queue 53 which is not present in the main storage is provided, the information (e.g. identifier) of a process 31 and 32 whose state is changed by the adapter 6 is added to this queue 53, and the state-changing facility 51 which periodically checks the information in the queue (Refer to Modification 5 above) reads out this information.

For the queue 53, a storing means (or storage area) in the adapter or a storing means (or storage area) in the interrupt controller may be used.

(Modification 7)

The busy flag 68 described in the above embodiment may be implemented in hardware or software. For implementation in hardware, part of the adapter 6 or a circuit in the host 1 (e.g. inside of the interrupt controller circuit) may be used.

Possible methods for implementation in software include a method wherein the interrupt controller of the host 1 is configured so as to enable/disable interrupts from the adapter 6.

(Modification 8)

In the above description, the adapter 6 is located between the internal I/O bus 107 of the host 1 and the network 7, as illustrated in FIG. 2, for making the description and the drawings easier to understand. However, the present invention is not limited to this mode of operation. Concrete examples of other possible modes of operation include an adapter between InfiniBand and other networks. (In this case, the InfiniBand is equivalent to an internal bus.) Another possible mode of operation is that the adapter is connected only to InfiniBand through one or more connections, and TCP/IP over InfiniBand is processed by this adapter. (In this case, the internal bus and the external network are constituted by one or more InfiniBand networks.)

(Modification 9)

The above descriptions assume that the host 1 is a data processing device such as a computer for making the description and the drawings easier to understand. However, the present invention is not limited to such data processing devices but is also applicable to, for example, storage devices, network devices, such as switches and routers, and adapters therefor. In this case, devices use an operating system for embedded devices, and there are cases where such an operating system does not have the concept of process 31 and 32. Nevertheless, the present invention can be used to control I/O processing.

(Modification 10)

In the above description, the present invention controls the state of the processes 31 and 32. However, the present invention is not limited to the processes 31 and 32 but can be used to control the processing threads in each process 31 and 32.

For the purpose of distribution, a program for the implementation of the present invention may be stored in a program storage medium, such as a disk storage, solely or in combination with other programs. Further, a program for the implementation of the present invention may be of such a type that the program is added to a program for communication already in use, or of such a type that the program replaces part of the program for communication.

The embodiments disclosed above should be all considered as examples and should not be considered restrictive.

The scope of the present invention is set forth by the claims described later, not by the above description. The present invention is intended to include every modification to the extent that the meaning and substance of the modification is equivalent to those of the following

What is claimed is:

1. An input/output method for an information processing device including a plurality of CPUs, a main memory, and an adapter for conducting data input/output with an external device or an external network, a plurality of applications being loaded in the information processing device and managed by an operating system provided to the information processing device, the method comprising:

allocating communication endpoints of the adapter to each of the plurality of applications and establishing logical connections between the plurality of applications and the communication endpoints allocated thereto;

after the allocation and establishing step, recording a main memory address of an entry indicating a state of each of the plurality of applications which corresponds to one of the communication endpoints in a process table managed by scheduling means of the operating system and in a state-changing mechanism provided in each of the communication endpoints;

updating, at a time of data transmission in one of the logical connections, a state of a respective one of the plurality of applications recorded in the process table to an "I/O wait" state through protocol processing contained in the operating system when the respective application uses a blocking call on said logical connection;

specifying, by the adapter, the state of said application into "runnable" in the respective state-changing mechanism and in the process table upon completion of the data transmission in said logical connection; and controlling said application to be executed by calling the scheduling means with an interrupt activated by the adapter or a timer.

2. The input/output method according to claim 1, further comprising checking a flag that indicates whether any one of the CPUs is in an idle state, after the state of said application is changed into the "runnable" state, wherein the interrupt from the adapter to the scheduling means is caused immediately after the flag is confirmed to be set as "true".

3. An information processing device comprising:
a plurality of CPUs;
a main memory; and
an adapter which includes communication endpoints each having a state-changing mechanism and a memory, and performs data input/output operations eternally, wherein a plurality of applications loaded in the information processing device are managed by an operating system provided to the information processing device, and the operation system allocates communication endpoints of the adapter to each of the plurality of applications and establishes logical connections between the plurality of applications and the communication endpoints allocated thereto, after the allocation and establishing step, the operation system records a main memory address of an entry indicating a state of each of the plurality of applications which corresponds to one of the communication endpoints in a process table managed by scheduling means of the operating system and in a state-changing mechanism provided in each of the communication endpoints, the operation system updates, at a time of data transmission in one of the logical connections, a state of a respective one of the plurality of applications recorded in the process table to an "I/O wait" state through protocol processing contained in the operating system when the respective application uses a blocking call on said logical connection;

the adapter specifies the state of said application into "runnable" in the respective state-changing mechanism and in the process table upon completion of the data transmission in said logical connection, and the operation system controls said application to be executed by calling the scheduling means with an interrupt activated by the adapter or a timer.

4. The information processing device according to claim 3, wherein the operation system checks a flag that indicates whether any one of the CPUs is in an idle state, after the state of said application is changed into the "runnable" state, and the interrupt from the adapter to the scheduling means is caused immediately after the flag is confirmed to be set as "true."

* * * * *